United States Patent
Napper et al.

(10) Patent No.: US 11,617,076 B2
(45) Date of Patent: Mar. 28, 2023

(54) CLIENTLESS VPN ROAMING WITH 802.1X AUTHENTICATION

(71) Applicant: Cisco Technology Inc., San Jose, CA (US)

(72) Inventors: Jeffrey Napper, Delft (NL); Alessandro Duminuco, Milan (IT); Hendrikus G. P. (Peter) Bosch, Aalsmeer (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/901,248

(22) Filed: Jun. 15, 2020

(65) Prior Publication Data

US 2021/0392492 A1 Dec. 16, 2021

(51) Int. Cl.
| | |
|---|---|
| *H04W 12/037* | (2021.01) |
| *H04W 76/12* | (2018.01) |
| *H04L 9/40* | (2022.01) |
| *H04L 9/32* | (2006.01) |
| *H04W 88/18* | (2009.01) |
| *H04W 84/12* | (2009.01) |
| *H04W 88/16* | (2009.01) |

(52) U.S. Cl.
CPC ......... *H04W 12/037* (2021.01); *H04L 9/3271* (2013.01); *H04L 63/0272* (2013.01); *H04L 63/0884* (2013.01); *H04W 76/12* (2018.02); *H04W 84/12* (2013.01); *H04W 88/16* (2013.01); *H04W 88/182* (2013.01)

(58) Field of Classification Search
CPC .. H04W 12/037; H04W 76/12; H04L 9/3271; H04L 63/0272; H04L 63/0884

USPC .......................................................... 726/5
See application file for complete search history.

(56) References Cited

U.S. PATENT DOCUMENTS

| | | | |
|---|---|---|---|
| 8,443,435 B1 * | 5/2013 | Schroeder | H04L 63/0272 726/15 |
| 9,565,172 B2 | 2/2017 | Stahl | |

(Continued)

FOREIGN PATENT DOCUMENTS

| | | | | |
|---|---|---|---|---|
| EP | 2009866 A1 * | 12/2008 | | H04W 60/00 |
| GB | 2542573 A * | 3/2017 | | G06F 9/45558 |

(Continued)

*Primary Examiner* — Haresh N Patel
(74) *Attorney, Agent, or Firm* — Baker Botts L.L.P.

(57) ABSTRACT

The present disclosure is directed to systems and methods for clientless virtual private network (VPN) roaming with 802.1x authentication and includes one or more processors and one or more computer-readable non-transitory storage media coupled to the one or more processors and comprising instructions that, when executed by the one or more processors, cause one or more components to perform operations including, receiving, at a local proxy, an 802.1x communication including authentication information from a remote device wirelessly connected to a visited network, wherein the remote device requests access to an enterprise network; authenticating the remote device with the enterprise network using the authentication information; establishing an encrypted tunnel between the visited network and the enterprise network; and transmitting data between the remote device and the enterprise network through the encrypted tunnel.

17 Claims, 4 Drawing Sheets

(56) References Cited

U.S. PATENT DOCUMENTS

| | | |
|---|---|---|
| 9,572,096 B2 | 2/2017 | Kim et al. |
| 10,021,560 B2 | 7/2018 | Kant et al. |
| 11,070,633 B2* | 7/2021 | Lepp ................. H04L 67/42 |
| 2008/0192739 A1* | 8/2008 | Carrasco ............ H04L 45/50 |
| | | 370/389 |
| 2008/0270795 A1* | 10/2008 | Lonardo .......... H04L 63/0272 |
| | | 713/168 |
| 2009/0172398 A1* | 7/2009 | Falk ................... H04W 12/06 |
| | | 713/168 |
| 2013/0318194 A1* | 11/2013 | Timbs ............ G06F 9/30047 |
| | | 709/213 |
| 2014/0310512 A1* | 10/2014 | Sau ..................... H04L 63/029 |
| | | 713/151 |
| 2015/0039677 A1* | 2/2015 | Kahol ............ H04L 63/0884 |
| | | 709/203 |
| 2015/0244876 A1* | 8/2015 | Jabara ............. H04M 15/8228 |
| | | 455/406 |
| 2016/0048397 A1* | 2/2016 | Morales .............. H04W 12/02 |
| | | 713/2 |
| 2016/0337784 A1* | 11/2016 | Nicholson ............. H04L 63/20 |
| 2017/0078408 A1* | 3/2017 | Lepp ..................... H04L 67/42 |
| 2017/0126664 A1* | 5/2017 | Khandelwal ...... H04L 63/0272 |
| 2017/0180351 A1* | 6/2017 | Lu .................... H04L 67/146 |
| 2018/0152447 A1* | 5/2018 | Brockhaus ......... H04L 63/0281 |
| 2018/0270201 A1* | 9/2018 | Chanak ............. H04L 63/029 |
| 2018/0375760 A1* | 12/2018 | Saavedra ........... H04L 12/4633 |
| 2019/0036888 A1* | 1/2019 | Pularikkal ........ H04L 63/0876 |
| 2019/0089741 A1* | 3/2019 | Hill ................... H04L 63/0428 |
| 2019/0174011 A1* | 6/2019 | Jabara ................. H04W 12/06 |
| 2020/0129874 A1* | 4/2020 | Culver, II ............. A63H 3/28 |
| 2020/0389869 A1* | 12/2020 | Patil ................... H04W 40/22 |
| 2021/0014233 A1* | 1/2021 | Kuppannan ........ H04L 63/102 |
| 2021/0168661 A1* | 6/2021 | Wong ................. H04W 28/26 |
| 2021/0351610 A1* | 11/2021 | Kanarellis ............ H02J 50/80 |
| 2021/0360390 A1* | 11/2021 | Chun .................... H04W 8/24 |

FOREIGN PATENT DOCUMENTS

| | | | | |
|---|---|---|---|---|
| KR | 20100022530 A | * | 3/2010 | |
| WO | WO-0243405 A1 | * | 5/2002 | .......... H04Q 3/0025 |
| WO | WO-2009052867 A1 | * | 4/2009 | ....... H04L 29/12952 |

* cited by examiner

CLIENTLESS VPN ROAMING WITH 802.1X AUTHENTICATION

TECHNICAL FIELD

The present disclosure generally relates to systems and methods for clientless roaming, and more specifically to systems and methods for clientless virtual private network (VPN) roaming with 802.1x authentication.

BACKGROUND

As enterprise networks are increasingly built as a service, more enterprise applications are hosted as a cloud service, and more enterprise users are connecting to their enterprise while being off-network or off-premises.

DESCRIPTION OF EXAMPLE EMBODIMENTS

Overview

Figure 1:
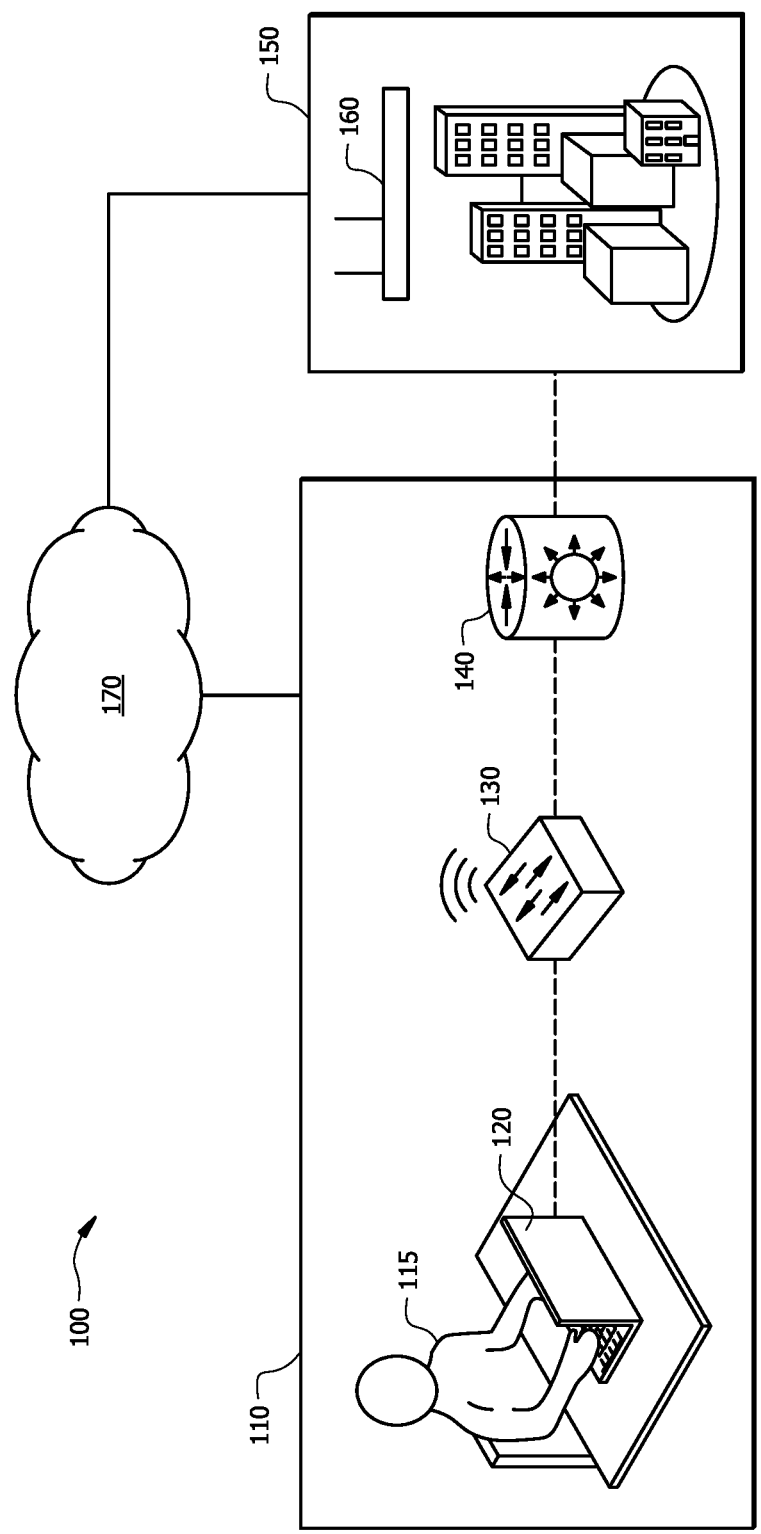
FIG. 1 illustrates a system for clientless VPN roaming with 802.1x authentication, in accordance with certain embodiments.

According to an embodiment, a system may include one or more processors and one or more computer-readable non-transitory storage media comprising instructions that, when executed by the one or more processors, cause one or more components of the system to perform operations including, receiving, at a local proxy, an 802.1x communication including authentication information from a remote device wirelessly connected to a visited network, wherein the remote device requests access to an enterprise network; authenticating the remote device with the enterprise network using the authentication information; establishing an encrypted tunnel between the visited network and the enterprise network; and transmitting data between the remote device and the enterprise network through the encrypted tunnel.

Moreover, the authentication information may include one or more of a network access identifier (NAI) associated with the remote device, a realm associated with the enterprise network in which the remote device is authenticated, an Extensible Authentication Protocol (EAP) associated with the remote device, and cryptographic data specific to the EAP.

Additionally, the encrypted tunnel may be established based on authentication of the remote device with the enterprise network. Alternatively, the encrypted tunnel may be established separate from authentication of the remote device based on credentials of the local proxy.

Moreover, the availability of the local proxy for connection to the enterprise network may be advertised to the remote device via at least one of a generic advertisement service (GAS) protocol extension or an access network query protocol (ANQP) extension.

Additionally, the encrypted tunnel may be available for use only by the authenticated remote device. According to another embodiment, the encrypted tunnel may be shared between a plurality of remote devices accessing the enterprise network.

According to another embodiment, a method may include the steps of receiving, at a local proxy, an 802.1x communication including authentication information from a remote device wirelessly connected to a visited network, wherein the remote device requests access to an enterprise network; authenticating the remote device with the enterprise network using the authentication information; establishing an encrypted tunnel between the visited network and the enterprise network; and transmitting data between the remote device and the enterprise network through the encrypted tunnel.

According to yet another embodiment, one or more computer-readable non-transitory storage media may embody instructions that, when executed by a processor, cause the performance of operations, including receiving, at a local proxy, an 802.1x communication including authentication information from a remote device wirelessly connected to a visited network, wherein the remote device requests access to an enterprise network; authenticating the remote device with the enterprise network using the authentication information; establishing an encrypted tunnel between the visited network and the enterprise network; and transmitting data between the remote device and the enterprise network through the encrypted tunnel.

Technical advantages of certain embodiments of this disclosure may include one or more of the following. The systems and methods described herein relate to an enterprise network-as-a-service, and may allow for roaming enterprise users to connect to an enterprise through a visited network. By allowing the visited network to temporarily connect and create an encrypted tunnel to the enterprise network, user traffic may be routed to the enterprise network. The systems and methods of the present disclosure may eliminate the need for a virtual private network (VPN) client, a per-application VPN, or the like. Instead, since the user (and/or his device) is already part of the enterprise network and may be authenticated as such using 802.1x authentication, he may connect to the network through the visited network, thereby avoiding the complexity of running a VPN client. Likewise, the enterprise may avoid running VPN infrastructures for roaming users.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Enterprise users are increasingly working off-premises, i.e., working from their homes, customer sites, or other non-traditional work locations (e.g., cafés, libraries, etc.) Enterprises want to enable these users to work from any location without complicated device management or authentication procedures. Conventionally, VPN clients (software applications) are installed on users' devices to establish a connection with the enterprise networks, but these are increasingly seen as cumbersome. The present disclosure is directed to a mechanism to allow remote devices authenticated enterprise access in visited networks without installing agents or clients on the remote devices. Enterprises may still retain control over employee authentication and authorization and may monitor and enforce traffic policy.

In accordance with the present disclosure, when a remote device enters a visited network, 802.1x authentication may be utilized in a visited network to create a trusted clientless VPN connection between the visited network and the enterprise network. To enable this trust relationship, the present disclosure presumes a contractual relationship between the visited network provider and a roaming consortium, of which the enterprise is a member. The visited network is enabled to set up a local proxy that creates an encrypted tunnel from the visited network to the enterprise network. Traffic from the remote device is transmitted through the tunnel for encapsulation to the enterprise network in accordance with the enterprise's traffic policies.

FIG. 1 depicts a system 100 for clientless VPN roaming with 802.1x authentication. More specifically, FIG. 1 depicts a system 100 for creating an encrypted tunnel between a visited network 110 and an enterprise network 150 using a client authentication process, which may be applicable in both wired and wireless use cases. The visited network 110 of system 100 may refer to any public network in which a remote device 120 of a user 115 roams temporarily and which is outside the bounds of the user's 115 registered network. The visited network 110 may be associated with a café, a library, or any other location or building providing Wi-Fi access for network connectivity. The enterprise network 150 may refer to an enterprise's communications backbone that helps connect computers and related devices across departments in an enterprise. The enterprise network 150 may include an enterprise remote access gateway 160. The remote access gateway 160 is the gateway into which connections from an external network connects to access, for example, a server located on the enterprise network 150.

System 100 may further include a remote device 120 which has entered the visited network 110. Remote device 120 may include a laptop, a tablet, a mobile phone, or any other device having Wi-Fi capability for accessing a network 170. The remote device 120 may be used by an enterprise user 115 to access enterprise resources in the enterprise network 150.

The visited network 110 may also include an authenticator 130. In an embodiment, when the visited network 110 includes a Wi-Fi access point (not shown) without a controller, the authenticator 130 may be located at the access point. In another embodiment, when the visited network 110 includes a wireless local area network (LAN) controller, the authenticator 130 may be located at the wireless LAN controller.

Additionally, the visited network 110 may include a local proxy 140. The local proxy 140 may be a virtual, software-based function or may be a physical device. In an embodiment, the local proxy 140 may be co-located with the authenticator 130 and/or access point in the visited network 110. In another embodiment, the local proxy 140 may be located at a portal or gateway, i.e., the point at which the visited network 110 connects with an external network. In essence, the local proxy 140 sits between the remote device 120 and the enterprise network 150, and in accordance with the present disclosure, as further described below, will connect with the remote access gateway 160 of the enterprise network 150. It is to be understood that the local proxy 140 may essentially be located anywhere, as long as it is configured to receive client traffic from the remote device 120.

As noted above, in accordance with the present disclosure, it is to be assumed that the network provider associated with the visited network 110 has a contractual relationship with a roaming consortium, of which the enterprise network 150 is a member. As a result of this trust agreement, the visited network 110 may be allowed to set up the trusted local proxy 140 (i.e., having certificates trusted by the enterprise network 150 and its devices) within the visited network 110.

In operation, system 100 may function as follows. First, the remote device 120, upon entering the visited network 110 (i.e., when the enterprise user 115 enters with his remote device 120 into the physical location associated with the visited network 110), may query the network 170 and associate with a Wi-Fi access point. In an embodiment, the remote device 120 may associate with the access point using a protocol such as Generic Advertisement Service (GAS) or Access Network Query Protocol (ANQP). In an embodiment, when the remote device 120 associates with the access point, extensions to GAS and/or ANQP may be used to advertise the availability of the local proxy 140 for connection to the enterprise network 150. In an embodiment, the GAS and/or ANQP extensions may be vendor-specific.

Once the remote device 120 has connected to the access point in the visited network 110, the authenticator 130 may send the remote device 120 a request to identify itself. The request may be in accordance with a 802.1x authentication protocol, such as extensible authentication protocol (EAP). The remote device 120 may respond to the authenticator 130 by providing authentication information. Authentication information may include, e.g., a network access identifier (NAI), the realm in which the remote device 120 wants to authenticate, the type of EAP protocol(s) that has been selected by or is associated with the remote device 120, and authentication/cryptographic data specific to the EAP protocol such as cryptographic certificates or secrets. The authenticator 130 may use the authentication information to determine whether it can authenticate the remote device 120. For example, the authenticator 130 may determine whether the NAI is valid, whether the visited network 110 supports the realm identified by the remote device 120, etc. The authenticator 130 may either accept or reject the remote device 120 based on the authentication information provided.

If the authenticator 130 accepts the remote device 120, the authenticator may begin authenticating the remote device 120 based on an 802.1x EAP authentication procedure using the NAI provided by the remote device 120. In an embodiment, the authentication procedure may be in accordance with a 802.1x EAP protocol indicated in the authentication information of the remote device 120. In an embodiment, the 802.1x protocol may be an EAP-TLS (Transport Layer Security) protocol. In other embodiments, the authentication procedure may be based on any other EAP authentication protocol known in the art.

The remote device 120 may accept the 802.1x protocol and attempt to connect to the local proxy 140 by name. The remote device 120 may know the name of the local proxy if, for example, it was advertised by the GAS or ANQP protocols, or if it was pre-configured on the remote device 120. As noted above, the local proxy 140 must be supported by a roaming consortium associated with the enterprise network 150. In an embodiment, where the visited network 110 includes a wireless LAN controller, the controller may use an ANQP extension to find a supported roaming consortium. In an embodiment, a given roaming consortium may imply support for a given local proxy. Once the remote device 120 begins a 802.1x EAP over LAN (EAPOL) connection to the authenticator 130, the EAP frames of the connection may be decapsulated and/or re-encapsulated by the authenticator 130 according to the 802.1x protocol, and forwarded to the local proxy 140. The local proxy 140 may accept the 802.1x connection, including authentication information, from the remote device 120. In accordance with the principles of the present disclosure, instead of connecting directly with the enterprise network using a VPN client, the remote device 120 may connect to the local proxy 140 in the visited network 110, which accepts the connection on behalf of the enterprise network 150. Thus, the local proxy 140 proxies the connection of the remote device 120 via an encrypted tunnel established between the visited network 110 and the enterprise network 150. The encrypted tunnel may be established based on the authentication of the remote device 120 with the enterprise network 150, or may be established separate from (e.g., before) the authentication of the remote device 120 based on credentials of the local proxy 140.

In one embodiment, the local proxy 140 may begin an authentication request with the remote access gateway 160 of the enterprise network 150 using the authentication information from the remote device 120. If the authentication with the remote access gateway 160 is successful, the local proxy 140 may establish or create an encrypted tunnel between the visited network 110 and the enterprise network 150 based on the authentication of the remote device with the enterprise network.

Specifically, in this embodiment, the local proxy 140 may form the endpoint of the 802.1x connection with the remote device 120. As such, the local proxy 140 may decrypt the data sent by the remote device 120 and then begin a new authentication request with the remote access gateway 160. In other words, the local proxy 140 may effectively maintain two separate encrypted tunnels, one between the local proxy 140 and the remote device 120, and one between the local proxy 140 and the remote access gateway 160. Thus, if there is a failure in connection between either the local proxy 140 and the remote device 120 or the local proxy 140 and the remote access gateway 160, the local proxy 140 may reinstate the connection on behalf of the remote device 120. In an embodiment, the local proxy 140 may proxy the authentication using either the same or a different protocol between the local proxy 140 and the remote access gateway 160.

In another embodiment, the tunnel setup may be separate from the authentication of the remote device 120, wherein the local proxy 140 may already have an existing tunnel set up between itself and the enterprise network 150. For example, the local proxy 140 may have set up the encrypted tunnel independently, e.g., before the connection was established with the remote device 120, using its own separate credentials. In this embodiment, the local proxy 140 may obtain and use the authentication information of the remote device 120 to authenticate only the specific connection between the remote device 120 and the remote access gateway 160. The authentication of the remote device 120 may proceed through the existing tunnel without the local proxy 140 initiating a separate authentication request.

Once established, the encrypted tunnel is configured to allow the transmission of data between the remote device 120 and the enterprise network 150. In an embodiment, the encrypted tunnel may be shared between multiple remote devices accessing the remote access gateway 160 of the enterprise network 150. In another embodiment, the local proxy 140 may create the encrypted tunnel using the authentication information of the remote device 120 (as described above), thereby creating the encrypted tunnel specific to the remote device 120.

It is to be understood that in order for the remote access gateway 160 to accept the tunnel, the enterprise network 150 must trust the local proxy 140. Since the local proxy 140 is associated with a roaming consortium accepted by the enterprise network 150, the local proxy 140 may use associated server certificates associated with the roaming consortium trusted by the remote access gateway 160 of the enterprise network 150. In some embodiments, the local proxy 140 and the enterprise endpoint may express trust using a public key infrastructure (PKI) architecture which permits public and private keys for authentication. This trust may be anchored in a set of root certificate authorities (CA) accepted by both the remote device 120 and remote access gateway 160 of the enterprise network 150. The PKI architecture need not be identical to that of the enterprise network 150, i.e., the local proxy 140 may use a different PKI root CA than the enterprise remote access gateway 160, but there must be a trust relationship transitively between all three parties (remote device, local proxy, and remote access gateway). The remote device 120 and remote access gateway 160, the remote device 120 and the local proxy 140, and the local proxy 140 and the remote access gateway 160 must each share a trust anchor. In other embodiments, trust may be expressed using other (non-PKI) methods, such as shared keys known by the local proxy 140 and the remote access gateway 160.

When authentication of the remote device 120 is completed, the local proxy 140 may set the tunnel as the end point for all data that comes from the remote device 120 and will return authorization success to the authenticator 130. The proxy session between the remote device 120 and the enterprise network 150 may then commence.

For security, all data from the remote device 120 may be sent to the local proxy 140, and transmitted through the encrypted tunnel to the enterprise network 150. The traffic stemming from the remote device 120 may be segregated from the traffic of other clients. Moreover, where a plurality of remote devices enter the visited network 110, they may not be allowed to communicate with one another through the encrypted tunnel. The traffic from the remote device 120 may also be "NATted" (referring to Network Address Translation, i.e., changing the source or destination address or ports of the traffic) by the local proxy 140 when entering or exiting the encrypted tunnel.

In another embodiment, a policy from the remote access gateway 160 or the roaming consortium may determine a subset of client traffic that will enter the tunnel to the enterprise network 150 while other traffic enters the visited network 110 and is then directed elsewhere, e.g., to the Internet.

The termination process of the clientless VPN session may be completed when the remote device 120 disassociates from the visited network 110, as the disassociation may prompt the local proxy 140 to remove the tunnel. For failure scenarios, the local proxy may recreate the tunnel on behalf of the remote device 120 as specified by existing remote access gateway 160 authorization or VPN technologies. If the local proxy cannot recreate tunnel, it can force disassociation of the remote device 120 to force the authentication process to restart.

The present disclosure eliminates the need for a VPN agent on the remote device 120 to provide the remote tunnel endpoint. Instead, during that authentication process, an encrypted tunnel is set up so that all of the traffic from the remote device 120 (or relevant traffic, as determined by the enterprise network 150) now goes back to the enterprise network 150 through a VPN set up in the visited network 110. Thus, a clientless VPN connection to the enterprise network 150 may be established while the remote device 120 is roaming without a installed VPN client.

Figure 2:
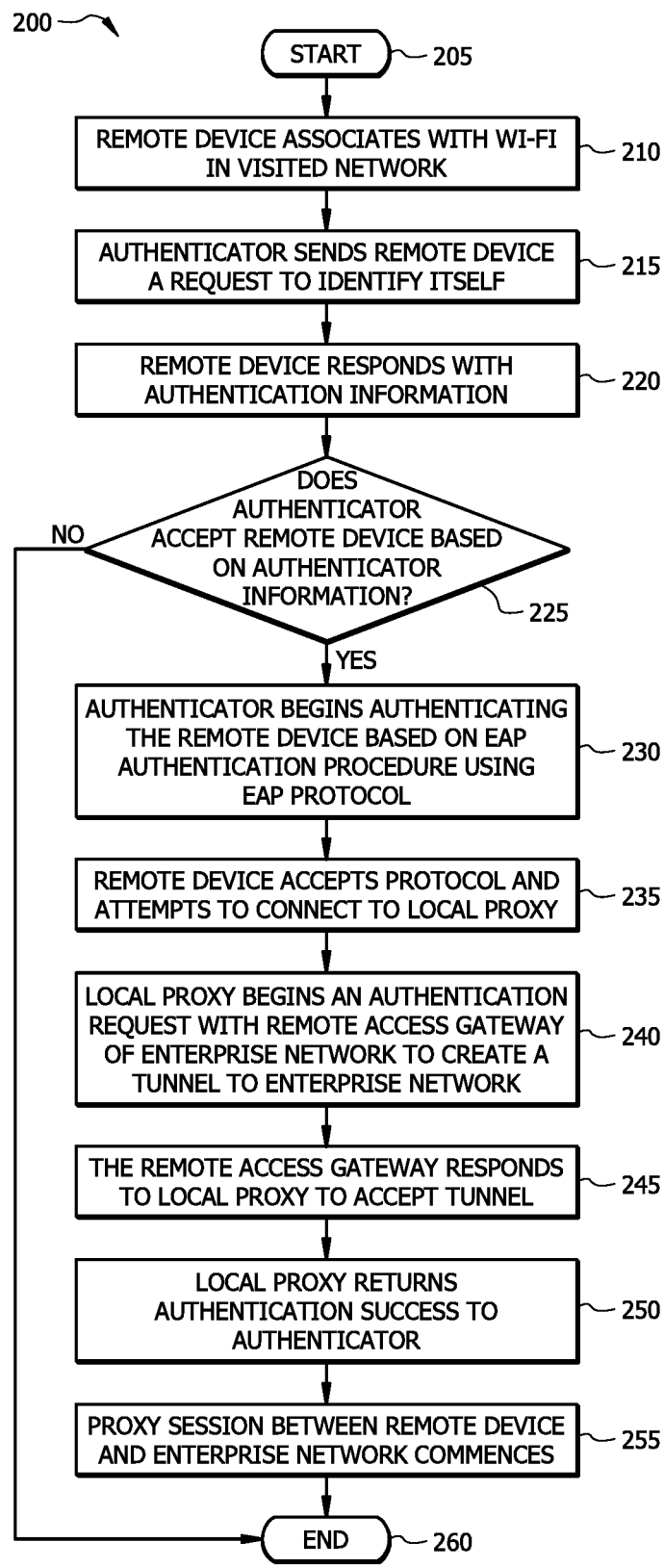
FIG. 2 illustrates a flow diagram of a method for creating a clientless VPN connection between a visited network and an enterprise network using 802.1x authentication, in accordance with certain embodiments.

Reference is now made to FIG. 2, which depicts a flow diagram of an embodiment of a method 200 for creating a clientless VPN connection between the visited network and the enterprise network using a 802.1x client authentication process. To enable this trust relationship, the present disclosure presumes a contractual relationship between a network provider of the visited network and a roaming consortium, of which the enterprise network is a member. The steps of method 200 may generally be in accord with the operations outlined in conjunction with system 100 of FIG. 1. As such, similar and corresponding terms described in conjunction with FIG. 1 have the same meaning when used in conjunction with method 200 of FIG. 2.

Method 200 may begin at step 205. At step 210, a remote device, when entering a visited network, may query the network and associate with a Wi-Fi access point. The remote device may include a laptop, a tablet, a mobile phone, or any other device having Wi-Fi capability for accessing a network. The remote device may be used by an enterprise user to access enterprise resources in an enterprise network. The visited network may refer to any public network in which the remote device may roam temporarily and which is outside the bounds of its registered network. The visited network may be associated with a café, a library, or any other location or building providing Wi-Fi access for network connectivity. In an embodiment, the remote device may associate with the access point using a protocol such as GAS or ANQP. In an embodiment, when the remote device associates with the access point in the visited network, an extension to GAS and/or ANQP may advertise the availability of a local proxy for connection to the enterprise network. In an embodiment, the GAS and/or ANQP extensions may be vendor-specific.

At step 215, an authenticator may send the remote device a request to identify itself. In an embodiment, when the visited network includes a Wi-Fi access point without a controller, the authenticator may be located at the access point. In another embodiment, when the visited network includes a wireless LAN controller, the authenticator may be located at the wireless LAN controller. The request sent by the authenticator may be in accordance with a 802.1x authentication protocol, such as EAP.

At step 220, the remote device may respond with authentication information. Authentication information may include, e.g., a NAI, the realm in which the remote device wants to authenticate, the type of EAP protocol(s) that has been selected by or is associated with the remote device, and authentication/cryptographic data specific to the EAP protocol such as cryptographic certificates or secrets.

At step 225, a determination may be made as to whether the authenticator has accepted the remote device based on the authentication information. For example, the authenticator may determine whether the NAI is valid, whether the visited network supports the realm identified by the remote device, etc. The authenticator may either accept or reject the remote device based on the authentication information provided. If, at step 225, the remote device has not been accepted based on the authentication information, the method may end at step 260. If, however, at step 225, the remote device has been accepted based on the authentication information, the method may proceed to step 230, wherein the authenticator begins authenticating the remote device based on a 802.1x EAP authentication procedure using the NAI provided by the remote device. The authentication procedure may be in accordance with a 802.1x EAP protocol indicated in the authentication information of the remote device. In an embodiment, the 802.1x protocol may be an EAP-TLS protocol. In other embodiments, the authentication procedure may be based on any other EAP authentication protocol known in the art.

At step 235, the remote device may accept the protocol and may attempt to connect to the local proxy by name. The remote device may know the name of the local proxy if, for example, it was advertised by the GAS or ANQP protocols, or if it was pre-configured on the remote device. As noted above, the local proxy must be supported by a roaming consortium associated with the enterprise network. In an embodiment, where the visited network includes a wireless LAN controller, the controller may use an ANQP extension to find a supported roaming consortium. A given roaming consortium may imply support for a given local proxy. Once the remote device begins a 802.1x EAPOL connection to the authenticator, the authenticator may decapsulate and/or re-encapsulate the EAP frames according to the 802.1x protocol and forward them to the local proxy. The local proxy may then accept the 802.1x connection, including the authentication information, from the remote device. Thus, instead of connecting directly with the enterprise network using a VPN client, the remote device may connect to the local proxy in the visited network, which accepts the connection on behalf of the enterprise network. Thus, the local proxy proxies the connection of the remote device.

At step 240, the local proxy, having accepted the 802.1x connection and authentication information from the remote device, may begin the authentication request with the remote access gateway of the enterprise network to create an encrypted tunnel to the enterprise network. The local proxy may use the authentication information from the remote device. If the authentication with the remote access gateway is successful, the local proxy may establish or create an encrypted tunnel between the visited network and the enterprise network.

In the embodiment shown in FIG. 2, the local proxy may form the endpoint of the 802.1x connection with the remote device. As such, the local proxy may decrypt the data sent by the remote device and then begin a new authentication request with the remote access gateway. In other words, the local proxy may effectively maintain two separate encrypted tunnels, one between the local proxy and the remote device, and one between the local proxy and the remote access gateway. Thus, if there is a failure in connection between either the local proxy and the remote device or the local proxy and the remote access gateway, the local proxy may reinstate the connection on behalf of the remote device. In an embodiment, the local proxy may proxy the authentication using either the same or a different protocol between the local proxy and the remote access gateway.

In another embodiment (not shown in FIG. 2), the tunnel setup may be separate from the authentication of the remote device, wherein the local proxy may already have an existing tunnel set up between itself and the enterprise network. For example, the local proxy may have set up the encrypted tunnel independently, e.g., before the connection was established with the remote device, using its own separate credentials. In this embodiment, the local proxy may obtain and use the authentication information of the remote device to authenticate only the specific connection between the remote device and the remote access gateway. The authentication of the remote device may proceed through the existing tunnel without the local proxy initiating an authentication request.

At step 245, the remote access gateway may respond to the local proxy to accept the tunnel. The local proxy may set the encrypted tunnel as the end point for all data that comes from the remote device. In an embodiment, the encrypted tunnel may be shared between multiple remote devices accessing the remote access gateway of the enterprise network. In another embodiment, if the local proxy creates the encrypted tunnel using the authentication information of the remote device (as described above), the encrypted tunnel may be established for use only by the authenticated remote device.

It is to be understood that in order for the remote access gateway to accept the tunnel, the enterprise network must trust the local proxy. Since the local proxy is associated with a roaming consortium accepted by the enterprise network, the local proxy may use associated server certificates associated with the roaming consortium trusted by the remote access gateway of the enterprise network. In some embodiments, the local proxy and the enterprise endpoint may express trust using a PKI architecture which permits public and private keys for authentication. This trust may be anchored in a set of root certificate authorities (CA) accepted by both the remote device and remote access gateway of the enterprise network. The PKI architecture need not be identical to that of the enterprise network, i.e., the local proxy may use a different PKI root CA than the enterprise remote access gateway, but there must be a trust relationship transitively between all three parties (remote device, local proxy, and remote access gateway). The remote device and remote access gateway, the remote device and the local proxy, and the local proxy and the remote access gateway must each share a trust anchor. In other embodiments, trust may be expressed using other (non-PKI) methods, such as shared keys known by the local proxy and the remote access gateway.

At step 250, the local proxy may return authentication success to the authenticator.

At step 255, the proxy session between the remote device and the enterprise network may commence. For security, all data from the remote device may be sent to the local proxy, and be transmitted through the encrypted tunnel to the enterprise network. The traffic stemming from the remote device be segregated from the traffic of other clients. Moreover, where a plurality of remote devices enter the visited network, they may not be allowed to communicate with one another through the encrypted tunnel. The traffic from the remote device may also be NATted (i.e., changing the source or destination address or ports of the traffic) by the local proxy when entering or exiting the encrypted tunnel.

In another embodiment, a policy from the remote access gateway or the roaming consortium may determine a subset of client traffic that will enter the tunnel to the enterprise network while other traffic enters the visited network and is then directed elsewhere, e.g., to the Internet.

In an embodiment, the VPN session may be terminated when the remote device disassociates from the visited network. The disassociation may prompt the local proxy to remove the tunnel. For failure scenarios, the local proxy may recreate the tunnel on behalf of the remote device as specified by existing remote access gateway authorization or VPN technologies. If the local proxy cannot recreate tunnel, it can force disassociation of the remote device to force the authentication process to restart.

At step 260, the method 200 may end.

Figure 3:
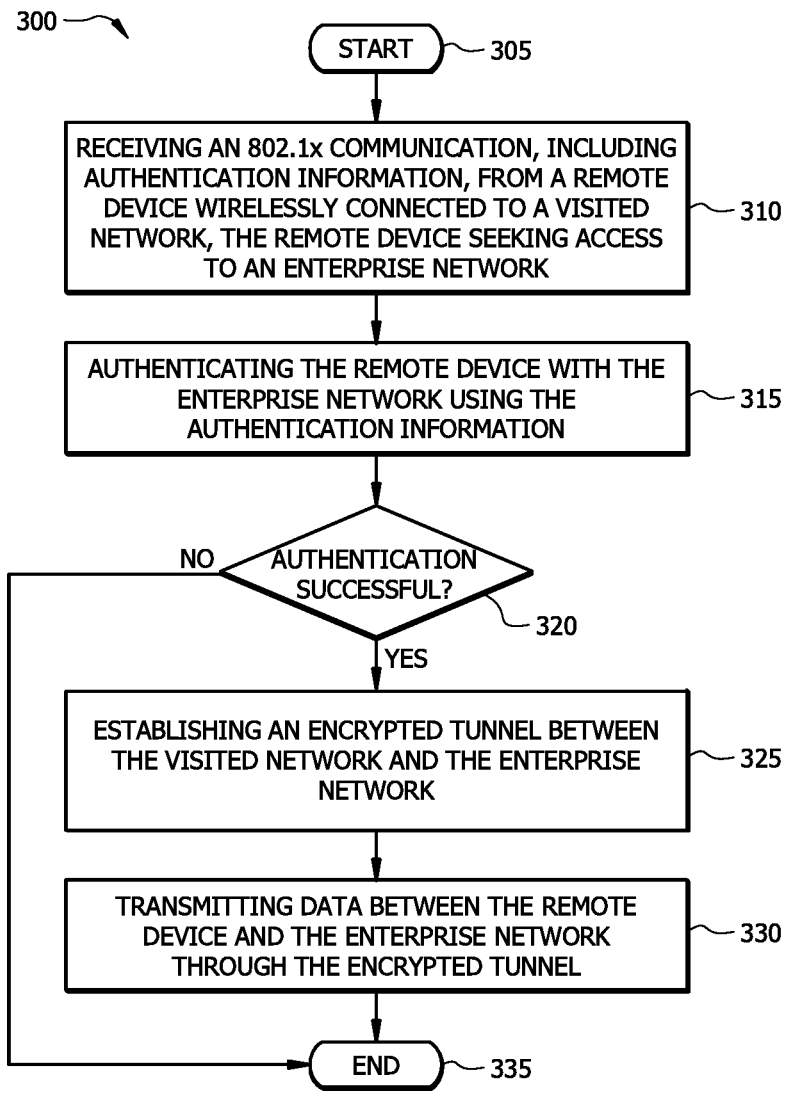
FIG. 3 illustrates a flow diagram of another method for creating a clientless VPN connection between a visited network and an enterprise network using 802.1x authentication, in accordance with certain embodiments.

Reference is now made to FIG. 3, which depicts a flow diagram of another embodiment of a method 300 for creating a clientless VPN connection between a visited network and an enterprise network using 802.1x client authentication. The method 300 details the concepts of the present disclosure from the perspective of the local proxy. Method 300 presumes completion of certain steps which may have been performed by the remote device, the authenticator, and/or the remote access gateway of the enterprise network, as described above in conjunction with FIGS. 1 and 2. For example, the method 300 of FIG. 3 requires a trust relationship between at least the visited network and the enterprise network, wherein this trust is founded on a contractual relationship between a network provider of the visited network and a roaming consortium, of which the enterprise network is a member. In other words, the local proxy is supported by a roaming consortium of which the enterprise network is a member. Additionally, in an embodiment, method 300 presumes that a remote device has entered the visited network, queried the network and associated with a Wi-Fi access point and wireless connected to the visited network. In an embodiment, the remote device may include a laptop, a tablet, a mobile phone, or any other device having Wi-Fi capability for accessing a network. The remote device may be used by an enterprise user to access enterprise resources in an enterprise network. In an embodiment, the visited network may refer to any public network in which the remote device may roam temporarily, which is outside the bounds of its registered network. The visited network may be associated with a café, a library, or any other location or building providing Wi-Fi access for network connectivity.

Method 300 further presumes that the remote device has been authenticated by an authenticator using an 802.1x authentication procedure based on a 802.1x protocol such as EAP, as described above in conjunction with FIGS. 1 and 2. The remote device may respond to the request for authentication received from the authenticator by providing authentication information. Authentication information may include, e.g., a NAI, the realm in which the remote device wants to authenticate, the type of EAP protocol(s) that is selected by or associated with the remote device, and authentication/cryptographic data specific to the EAP protocol such as cryptographic certificates or secrets. It is also presumed that the remote device has accepted the 802.1x protocol prior to the beginning of method 300. Further, it is noted that the steps of method 300 may generally be in accord with the operations described in conjunction with system 100 of FIG. 1 and method 200 of FIG. 2, which descriptions are incorporated herein by reference. As such, similar and corresponding terms described in conjunction with FIGS. 1 and 2 may have the same or similar meaning when used in conjunction with method 300 of FIG. 3.

The method 300 may begin at step 305. At step 310, an 802.1x communication, including authentication information, may be received by the local proxy from a remote device wirelessly connected to a visited network, wherein the remote device is seeking or requesting access to an enterprise network. Instead of connecting directly with the enterprise network using a VPN client, the remote device may connect to the local proxy in the visited network, which accepts the connection on behalf of the enterprise network. Thus, the local proxy may proxy the connection of the remote device. In an embodiment, the availability of the local proxy for connection to the enterprise network may be advertised to the remote device via a GAS protocol extension. In another embodiment, availability of the local proxy for connection to the enterprise network is advertised to the remote device via an ANQP extension. In yet another embodiment, the name and/or availability of the local proxy may be pre-configured on the remote device.

At step 315, the remote device may be authenticated with the enterprise network using the authentication information. As described above, authentication information may include one or more of a NAI associated with the remote device, the realm associated with the enterprise network in which the remote device wants to authenticate, the type of EAP protocol(s) that has been selected by or is associated with the remote device, and authentication/cryptographic data specific to the EAP protocol such as cryptographic certificates or secrets.

At step 320, a determination is made as to whether authentication of the remote device is successful. If, at step 320, the authentication of the remote device is not successful, the method may end. If, however, at step 320, the authentication of the remote device is successful, the method may proceed to step 325, wherein an encrypted tunnel is established between the visited network and the enterprise network. The encrypted tunnel may be established based on the authentication of the remote device with the enterprise network, or may be established separate from the authentication of the remote device based on credentials of the local proxy.

In one embodiment, the encrypted tunnel is established based on the authentication of the remote device with the enterprise network. In other words, if the authentication with the remote access gateway is successful, the local proxy may establish or create an encrypted tunnel between the visited network and the enterprise network based on this authentication. Specifically, in this embodiment, the local proxy may form the endpoint of the 802.1x connection with the remote device. As such, the local proxy may decrypt the data sent by the remote device and then begin a new authentication request with the remote access gateway. In other words, the local proxy may effectively maintain two separate encrypted tunnels, one between the local proxy and the remote device, and one between the local proxy and the remote access gateway. Thus, if there is a failure in connection between either the local proxy and the remote device or the local proxy and the remote access gateway, the local proxy may reinstate the connection on behalf of the remote device. In an embodiment, the local proxy may proxy the authentication using either the same or a different protocol between the local proxy and the remote access gateway.

In another embodiment, the encrypted tunnel may be established separate from the authentication of the remote device. For example, the local proxy may have set up the encrypted tunnel independently, e.g., before the connection was established with the remote device, using its own separate credentials. In this embodiment, the local proxy may obtain and use the authentication information of the remote device to authenticate only the specific connection between the remote device and the remote access gateway. The authentication of the remote device may proceed through the existing tunnel without the local proxy initiating an authentication request. It is to be understood that, in this embodiment (where the encrypted tunnel is established separate from the authentication of the remote device), the step 325 of establishing the encrypted tunnel need not necessarily occur after the step 315 of authenticating the remote device. Rather, the step 325 may occur at any point in the method, e.g., after step 305, after step 310, after step 315, or at any other point in time before the indicated step 325.

Once the remote device has been authenticated with the enterprise network and the encrypted tunnel has been established, the encrypted tunnel is configured to allow the transmission of data between the remote device and the enterprise network. In an embodiment, the encrypted tunnel may be shared by a plurality of remote devices accessing the remote access gateway of the enterprise network. In another embodiment, the local proxy may create the encrypted tunnel using the authentication information of the remote device (as described above), thereby creating the encrypted tunnel for use only by the authenticated remote device.

It is to be understood that in order for the remote access gateway to accept the tunnel, the enterprise network must trust the local proxy. Since the local proxy is associated with a roaming consortium accepted by the enterprise network, the local proxy may use associated server certificates associated with the roaming consortium trusted by the remote access gateway of the enterprise network. In some embodiments, the local proxy and the enterprise endpoint may express trust using a PKI architecture which permits public and private keys for authentication. This trust may be anchored in a set of root certificate authorities (CA) accepted by both the remote device and remote access gateway of the enterprise network. The PKI architecture need not be identical to that of the enterprise network, i.e., the local proxy may use a different PKI root CA than the enterprise remote access gateway, but there must be a trust relationship transitively between all three parties (remote device, local proxy, and remote access gateway). The remote device and remote access gateway, the remote device and the local proxy, and the local proxy 140 and the remote access gateway must each share a trust anchor. In other embodiments, trust may be expressed using shared keys shared between the local proxy and the remote access gateway, as known and understood by one of skill in the art.

At step 330, data may be transmitted between the remote device and the enterprise network through the encrypted tunnel. Specifically, when authentication of the remote device is completed, the local proxy may set the tunnel as the end point for all data that comes from the remote device and will return authorization success to the authenticator. The proxy session between the remote device and the enterprise network may then commence. For security, all data from the remote device may be sent to the local proxy, and be transmitted through the encrypted tunnel to the enterprise network. The traffic stemming from the remote device be segregated from the traffic of other clients. Moreover, where a plurality of remote devices enter the visited network, they may not be allowed to communicate with one another through the encrypted tunnel. The traffic from the remote device may also be "NATted" (i.e., changing the source or destination address or ports of the traffic) by the local proxy when entering or exiting the encrypted tunnel. In another embodiment, a policy from the remote access gateway or the roaming consortium may determine a subset of client traffic that will enter the tunnel to the enterprise network while other traffic enters the visited network and is then directed elsewhere, e.g., to the Internet.

In an embodiment, the VPN session may be terminated when the remote device disassociates from the visited network. The disassociation may prompt the local proxy to remove the tunnel. For failure scenarios, the local proxy may recreate the tunnel on behalf of the remote device as specified by existing remote access gateway authorization or VPN technologies. If the local proxy cannot recreate tunnel, it can force disassociation of the remote device to force the authentication process to restart. The method may end at step 335.

In sum, the systems and methods of the present disclosure may allow for roaming enterprise users to connect to an enterprise through a visited network. By allowing the visited network to temporarily connect and create an encrypted tunnel to the enterprise network from the visited network, user traffic may be routed to the enterprise network without the need for a VPN client, a per-application VPN, or the like on the user's device.

Figure 4:
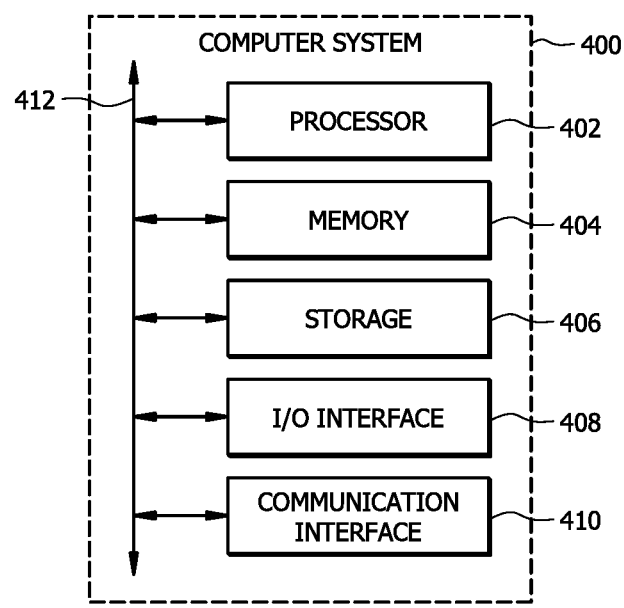
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate.

Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors; and
   one or more computer-readable non-transitory storage media comprising instructions that, when executed by the one or more processors, cause one or more components of the system to perform operations comprising:
      establishing, by a visited network, a local proxy within the visited network;
      receiving, at the local proxy, an 802.1x communication including authentication information from a remote device wirelessly connected to the visited network, wherein the remote device requests access to an enterprise network;
      advertising, to the remote device, availability of the local proxy for connection to the enterprise network via at least one of a generic advertisement service (GAS) protocol extension or an access network query protocol (ANQP) extension;
      authenticating the remote device with the enterprise network using the authentication information without installing a VPN client on the remote device;
      establishing a clientless encrypted tunnel between the visited network and the enterprise network; and
      transmitting data between the remote device and the enterprise network through the clientless encrypted tunnel.

2. The system of claim 1, wherein the authentication information comprises one or more of a network access identifier (NAI) associated with the remote device, a realm associated with the enterprise network in which the remote device is authenticated, an Extensible Authentication Protocol (EAP) associated with the remote device, and cryptographic data specific to the EAP.

3. The system of claim 1, wherein the clientless encrypted tunnel is established based on authentication of the remote device with the enterprise network.

4. The system of claim 1, wherein the clientless encrypted tunnel is established separate from authentication of the remote device based on credentials of the local proxy.

5. The system of claim 1, wherein the clientless encrypted tunnel is available for use only by the authenticated remote device.

6. The system of claim 1, wherein the clientless encrypted tunnel is shared between a plurality of remote devices accessing the enterprise network.

7. A method, comprising:
   establishing, by a visited network, a local proxy within the visited network;
   receiving, at the local proxy, an 802.1x communication including authentication information from a remote device wirelessly connected to the visited network, wherein the remote device requests access to an enterprise network;
   advertising, to the remote device, availability of the local proxy for connection to the enterprise network via at least one of a generic advertisement service (GAS) protocol extension or an access network query protocol (ANQP) extension;
   authenticating the remote device with the enterprise network using the authentication information without installing a VPN client on the remote device;
   establishing a clientless encrypted tunnel between the visited network and the enterprise network; and
   transmitting data between the remote device and the enterprise network through the clientless encrypted tunnel.

8. The method of claim 7, wherein the authentication information comprises one or more of a network access identifier (NAI) associated with the remote device, a realm associated with the enterprise network in which the remote device is authenticated, an Extensible Authentication Protocol (EAP) associated with the remote device, and cryptographic data specific to the EAP.

9. The method of claim 7, wherein the clientless encrypted tunnel is established based on authentication of the remote device with the enterprise network.

10. The method of claim 7, wherein the clientless encrypted tunnel is established separate from authentication of the remote device based on credentials of the local proxy.

11. The method of claim 7, wherein the clientless encrypted tunnel is available for use only by the authenticated remote device.

12. The method of claim 7, wherein the clientless encrypted tunnel is shared between a plurality of remote devices accessing the enterprise network.

13. One or more computer-readable non-transitory storage media embodying instructions that, when executed by a processor, cause performance of operations comprising:
   establishing, by a visited network, a local proxy within the visited network;

receiving, at the local proxy, an 802.1x communication including authentication information from a remote device wirelessly connected to the visited network, wherein the remote device requests access to an enterprise network;

advertising, to the remote device, availability of the local proxy for connection to the enterprise network via at least one of a generic advertisement service (GAS) protocol extension or an access network query protocol (ANOP) extension;

authenticating the remote device with the enterprise network using the authentication information without installing a VPN client on the remote device;

establishing a clientless encrypted tunnel between the visited network and the enterprise network; and transmitting data between the remote device and the enterprise network through the clientless encrypted tunnel.

14. The one or more computer-readable non-transitory storage media of claim 13, wherein the authentication information comprises one or more of a network access identifier (NAI) associated with the remote device, a realm associated with the enterprise network in which the remote device is authenticated, an Extensible Authentication Protocol (EAP) associated with the remote device, and cryptographic data specific to the EAP.

15. The one or more computer-readable non-transitory storage media of claim 13, wherein the clientless encrypted tunnel is established based on authentication of the remote device with the enterprise network.

16. The one or more computer-readable non-transitory storage media of claim 13, wherein the clientless encrypted tunnel is established separate from authentication of the remote device based on credentials of the local proxy.

17. The one or more computer-readable non-transitory storage media of claim 13, wherein the clientless encrypted tunnel is available for use only by the authenticated remote device.

* * * * *